(12) United States Patent  (10) Patent No.: US 9,059,596 B2
Chou et al.  (45) Date of Patent: Jun. 16, 2015

(54) BATTERY CHARGING CIRCUIT

(75) Inventors: Ying-Tzu Chou, New Taipei (TW); Chun-Ta Lee, New Taipei (TW)

(73) Assignee: WISTRON CORP., New Taipei (TW)

( * ) Notice: Subject to any disclaimer, the term of this patent is extended or adjusted under 35 U.S.C. 154(b) by 370 days.

(21) Appl. No.: 13/616,112

(22) Filed: Sep. 14, 2012

(65) Prior Publication Data

US 2013/0293186 A1   Nov. 7, 2013

(30) Foreign Application Priority Data

May 2, 2012   (TW) .............................. 101115566 A (51) Int. Cl.
  *H02J 7/00*   (2006.01)

(52) U.S. Cl.
  CPC ............... *H02J 7/0091* (2013.01); *H02J 7/007* (2013.01); *H02J 7/0088* (2013.01); *Y02E 70/40* (2013.01); *Y02B 40/90* (2013.01)

(58) Field of Classification Search
  CPC ........ H02J 7/007; H02J 7/0091; H02J 7/0088
  USPC ......................................... 320/107, 150, 137
  See application file for complete search history.

(56) References Cited

U.S. PATENT DOCUMENTS

| | | | |
|---|---|---|---|
| 5,861,729 A * | 1/1999 | Maeda et al. .................. | 320/106 |
| 5,900,717 A | 5/1999 | Lee | |
| 7,541,780 B2 * | 6/2009 | Nagasawa ...................... | 320/150 |
| 7,598,710 B2 | 10/2009 | Zhang | |
| 7,755,328 B2 * | 7/2010 | Zhou et al. ..................... | 320/145 |
| 7,804,278 B2 | 9/2010 | Maireanu et al. | |
| 7,843,165 B2 * | 11/2010 | Sakaue et al. .................. | 320/107 |
| 7,948,212 B2 * | 5/2011 | Odaohhara .................... | 320/150 |
| 8,860,376 B2 * | 10/2014 | Kimura et al. ................. | 320/153 |
| 2005/0134232 A1 * | 6/2005 | Yamamoto ..................... | 320/150 |
| 2005/0231169 A1 * | 10/2005 | Seo et al. ....................... | 320/150 |
| 2010/0277128 A1 * | 11/2010 | Tam et al. ...................... | 320/150 |
| 2013/0093399 A1 * | 4/2013 | Svensson et al. ............. | 320/150 |

FOREIGN PATENT DOCUMENTS

| | | |
|---|---|---|
| CN | 101237153 A | 8/2008 |
| TW | 333722 | 6/1998 |
| TW | I347060 | 8/2011 |

OTHER PUBLICATIONS

Taiwan Patent Office, Office Action issued on Feb. 19, 2014.
China Patent Office, Office action issued on Sep. 30, 2014.

\* cited by examiner

*Primary Examiner* — Stacy Whitmore
(74) *Attorney, Agent, or Firm* — Li & Cai Intellectual Property (USA) Office (57) ABSTRACT

The present disclosure illustrates a battery charging circuit, adapted for charging a rechargeable battery. The battery charging circuit includes a temperature sensing unit, a current control unit, and a charging unit. The temperature sensing unit is coupled to a temperature output pin of the rechargeable battery to output a temperature signal according to the sensed temperature of the rechargeable battery. The current control unit is coupled to the temperature sensing unit for outputting a control voltage according to the received temperature signal. The charging unit is coupled to the current control unit and outputs a charging current to charge the rechargeable battery. When temperature of the rechargeable battery exceeds a predefined temperature range, the charging unit discontinues outputting the charging current. Hence, the battery charging circuit can completely fulfill the charging requirement of the rechargeable battery thereby increase the associated charging efficiency.

9 Claims, 5 Drawing Sheets

BATTERY CHARGING CIRCUIT

BACKGROUND

1. Technical Field

The present disclosure relates to a charging circuit, in particular, to a battery charging circuit for configuring and outputting a charging current according the temperature of a rechargeable battery.

2. Description of Related Art

As technology advances, portable electronic devices, such as cell phones, notebooks, digital cameras, video cameras or MP3 players, have been widely used in our daily life. Portable electronic devices are often equipped with rechargeable batteries supplying the required power for the carrying convenience of user.

A rechargeable battery is an energy storage device of which repeatable charging and discharging processes can be performed, in particular, the rechargeable battery can be charged by a charging device. The lifetime of a rechargeable battery depends on factors including the material used for the rechargeable battery, the working environment (e.g., ambient temperature), the use time, and so on. In general to enhance the lifetime of the rechargeable battery, it is recommended to perform complete charging or discharging cycles, to avoid fully charged the battery or to define specific charging temperature range. It is known that in consideration of the rechargeable battery life, different charging current are used for different temperatures. However, the charging device generally is designed for outputting a constant charging current and the charging current may not be instantly adjusted according to the temperature of the rechargeable battery. Hence, the charging device is unable to satisfy the charging requirement of the rechargeable battery thereby reducing the associated charging efficiency and decreasing the overall product competitiveness.

SUMMARY

An exemplary embodiment of the present disclosure provides a battery charging circuit. The battery charging circuit can actively configure and generate adequate charging current to charge a rechargeable battery according to the sensed temperature of the rechargeable battery. The battery charging circuit may thus protect the rechargeable battery and increase the lifetime of the rechargeable battery. The battery charging circuit further may shorten the battery charging period thereby increase the associated charging efficiency.

An exemplary embodiment of the present disclosure provides the battery charging circuit which is adapted for charging a rechargeable battery. The battery charging circuit includes a temperature sensing unit, a current control unit, and a charging unit. The temperature sensing unit is coupled to a temperature output pin of the rechargeable battery for outputting a temperature signal according to the temperature of the rechargeable battery. The current control unit is coupled to the temperature sensing unit and is for outputting a control voltage according to the temperature signal. The charging unit is coupled to the current control unit and is for outputting a charging current to charge the rechargeable battery according to the control voltage. When temperature of the rechargeable battery exceeds a predefined temperature range, the charging unit discontinues outputting the charging current.

According to one exemplary embodiment of the present disclosure, a minimum value of the predefined temperature range is 0 degree Celsius, and a maximum value of the predefined temperature range is 60 degree Celsius.

According to one exemplary embodiment of the present disclosure, the charging unit gradually increases the charging current according to the temperature of the rechargeable battery when the temperature of the rechargeable battery is higher than a minimum value of the predefined temperature range; the charging unit gradually decreases the charging current according to the temperature of the rechargeable battery when the temperature of the rechargeable battery is higher than a threshold value; the charging unit discontinues outputting the charging current when the temperature of the rechargeable battery is higher than the maximum value of the predefined temperature range, wherein the threshold value is higher than the minimum value of the predefined temperature range while lower than the maximum value of the predefined temperature range.

According to one exemplary embodiment of the present disclosure, the temperature sensing unit includes a first resistor and a buffer. The first resistor is coupled between a power terminal and the temperature output pin. A non-inverting terminal of the buffer is coupled to the temperature output pin through a second resistor. An inverting terminal of the buffer is coupled to an output terminal of the buffer of which the temperature signal is outputted to the current control unit.

According to one exemplary embodiment of the present disclosure, the current control unit includes a first comparator, a first diode, a second comparator, a second diode, a third resistor, and a first power transistor. A non-inverting terminal of the first comparator is coupled to a minimum reference voltage. An inverting terminal of the first comparator is coupled to the output terminal of the buffer. An anode of the first diode is coupled to an output terminal of the first comparator. A non-inverting terminal of the second comparator is coupled to the output terminal of the buffer and an inverting terminal of the second comparator is coupled to a maximum reference voltage. An anode of the second diode is coupled to an output terminal of the second comparator. The third resistor has a first end coupled to the power terminal, and a second end thereof coupled to the charging unit. A drain of the first power transistor is coupled to the second end of the third resistor, and a source of the first power transistor is coupled to a ground. A gate of the first power transistor is respectively coupled to a cathode of the first diode and a cathode of the second diode. The minimum reference voltage corresponds to the maximum value of the predefined temperature range, and the maximum reference voltage corresponds to the minimum value of the predefined temperature range. The minimum reference voltage is less than the maximum reference voltage.

The first power transistor conducts to have the charging unit discontinue outputting the charging current when the voltage level of the temperature signal is less than the minimum reference voltage or when the voltage level of the temperature signal is greater than the maximum reference voltage.

According to one exemplary embodiment of the present disclosure, the charging unit includes a charging IC. The charging IC outputs the charging current to charge the rechargeable battery according to the received control voltage.

To sum up, the present disclosure illustrates the battery charging circuit which can actively generate the charging current according to the sensed temperature of the rechargeable battery and effectively charge the rechargeable battery. When the temperature of the rechargeable battery exceeds the predefined temperature range, the battery charging circuit stop charging the rechargeable battery instantly. Hence, the battery charging circuit can effectively protect the rechargeable battery while satisfy the charging requirement of the rechargeable battery thereby increase the associated charging efficiency further enhance the lifetime of the rechargeable battery.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.
[First Embodiment]

Figure 1:
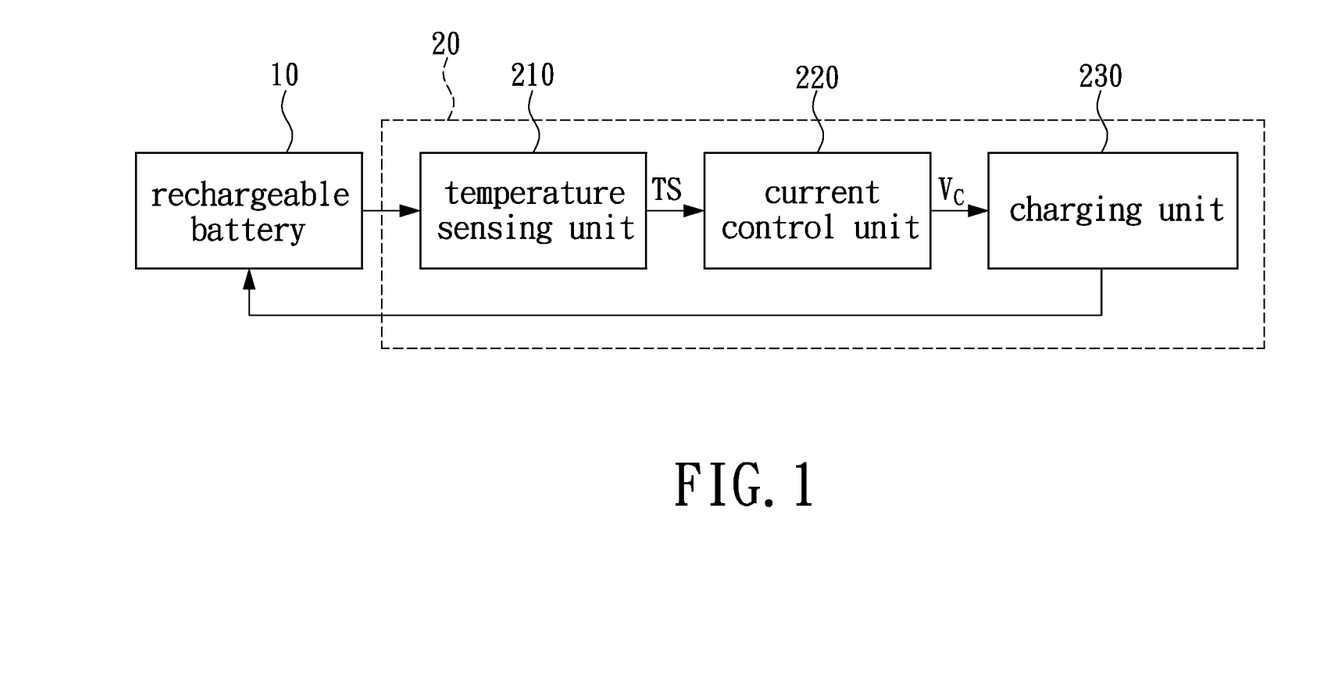
FIG. 1 is a functional block diagram of a battery charging circuit provided in accordance to a first embodiment of the present disclosure.

Referring to FIG. 1 which shows a functional block diagram of a battery charging circuit provided according to a first embodiment of the present disclosure. The battery charging circuit 20 is coupled to a rechargeable battery 10 for outputting a charging current charging the rechargeable battery 10 according to the temperature of the rechargeable battery 10. In the instant embodiment, the rechargeable battery 10 may be a single rechargeable battery, for example, a Lithium-Ion battery, a Ni—Cd battery, or a Ni-MH battery. The rechargeable battery 10 can further be a rechargeable battery pack or any other type of battery designed specifically for an electronic device and the present disclosure is not limited thereto.

A Thermistor (not shown in FIG. 1) is disposed in the rechargeable battery 10 for detecting the temperature thereof. In particular, the resistance of the Thermistor varies according to the temperature detected. The Thermistor can have negative temperature coefficient, NTC or positive temperature coefficient, PTC. The resistance of the Thermistor with negative temperature coefficient is inversely proportional to the temperature while the resistance of the Thermistor with positive temperature coefficient is directly proportional to the temperature. The instant embodiment uses the Thermistor with negative temperature coefficient for explanation, however the present disclosure is not limited herein.

The battery charging circuit 20 includes a temperature sensing unit 210, a current control unit 220, and a charging unit 230. The temperature sensing unit 210 is coupled to a temperature output pin of the rechargeable battery 10 and is used for outputting a temperature signal TS according to the sensed temperature of the rechargeable battery 10. The current control unit 220 is coupled to the temperature sensing unit 210 and is used for outputting a control voltage Vc according to the received temperature signal TS. The charging unit 230 is coupled to the current control unit 220 and the rechargeable battery 10. The charging unit 230 outputs a charging current charging the rechargeable battery 10 according to the control voltage Vc. When temperature of the rechargeable battery 10 exceeds a predefined temperature range, the charging unit 230 discontinues outputting the charging current so as to terminate the charging process. The battery charging circuit 230 may thus protect the rechargeable battery 10 thereby enhance the lifetime of the rechargeable battery 10

The predefined temperature range may be defined according to the type of the rechargeable battery 10 or the charging condition adopted. In the instant exemplary embodiment, the minimum value of the predefined temperature range is 0 degree Celsius and the maximum value of the predefined temperature range is 60 degree Celsius. When the temperature of the rechargeable battery 10 is either lower than 0 degree Celsius or higher than 60 degree Celsius, the charging unit 230 discontinues outputting the charging current to the rechargeable battery 10 so as to stop charging the rechargeable battery 10.

In particular, when the temperature of the rechargeable battery 10 sensed by the temperature sensing unit 210 is higher than 0 degree Celsius, the current control unit 220 drives the charging unit 230 to gradually increase the charging current according to the sensed temperature of the rechargeable battery 10. When the sensed temperature is higher than a threshold value, the current control unit 220 drives the charging unit 230 to gradually decrease the charging current according to the temperature of the rechargeable battery 10. The threshold value is higher than 0 degree Celsius while lower than 60 degree Celsius. In other words, the threshold value falls between 0 degree Celsius and 60 degree Celsius and may be chosen according to the charging requirement, for example, 30 degree Celsius however, the instant embodiment is not limited thereto.

Incidentally, the charging unit 230 defines the charging current according to the capacity of the rechargeable battery 10 and is measured in unit of C (capacity) in the instant embodiment. For instance, if the capacity of the rechargeable battery 10 is 600 milliampere per hour (mAh), meaning that if the charging current is 600 milliampere (mA), an hour is required to fully charge the rechargeable battery 10, and C equals to 600 mA. In other words, when the charging unit 230 outputs a charging current of 1C, the charging unit 230 is charging the rechargeable battery 10 with 600 mA; when the charging unit 230 outputs a charging current of 0.5C according to the sensed temperature, the charging unit 230 is charging the rechargeable battery 10 with 300 mA, and so on.

Figure 2:
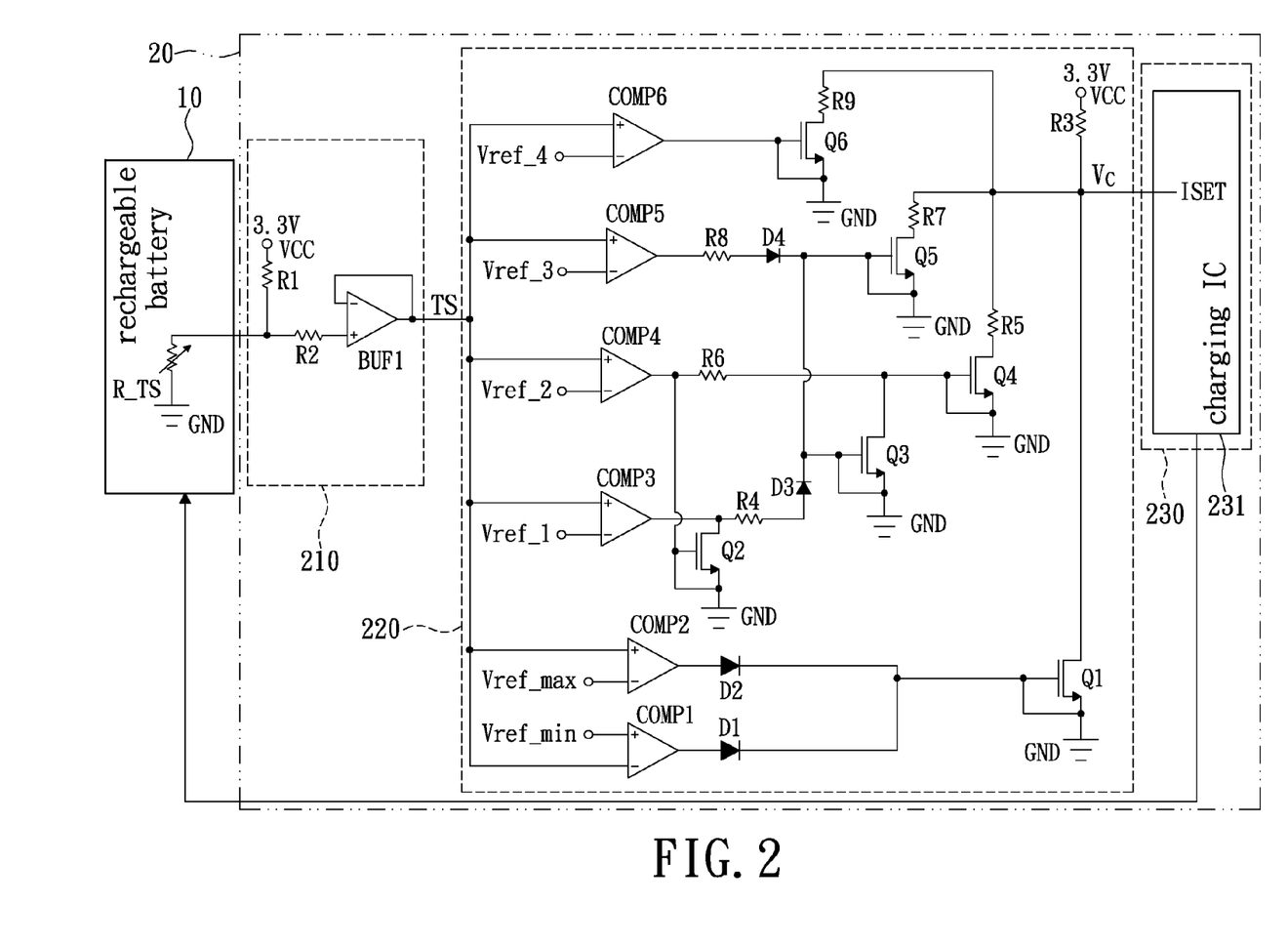
FIG. 2 is a schematic diagram illustrating the battery charging circuit provided in accordance to the first embodiment of the present disclosure.

The operation of the battery charging circuit 20 is further explained using an actual circuit structure. Referring to FIG. 2, which is a schematic diagram illustrating the battery charging circuit 20 according to the first embodiment of the present disclosure. The temperature sensing unit 210 includes resistors R1, R2, and a buffer BUF1. The current control unit 220 includes a plurality of comparators COMP1~COMP6, a plurality of resistors R3~R9, a plurality of power transistors Q1~Q6, and a plurality of diodes D1~D4. The charging unit 230 includes a charging IC 231.

In the instant embodiment, the power transistors Q1~Q6 are N-type metal oxide semiconductor field effect transistors (N-MOSFET). However, the present disclosure is not limited thereto as those skilled in art may choose any appropriate type or specification for the power transistors Q1~Q6.

To put it concretely, the above-described Thermistor R_TS with negative temperature coefficient is disposed in the rechargeable battery 10. The Thermistor R_TS has a first end thereof coupled to a temperature output pin of the rechargeable battery 10, and a second end thereof coupled to a ground GND. The resistance of the Thermistor R_TS varies according to the temperature of the rechargeable battery 10 in particular, the resistance of the Thermistor R_TS is inversely proportional to the temperature of the rechargeable battery 10. In other words, the higher the temperature of the rechargeable battery 10, the lower the resistance of the Thermistor R_TS.

The resistor R1 has a first end thereof coupled to a power terminal VCC, e.g., 3.3 volt (V). A second end of the resistor R1 is coupled to the temperature output pin of the rechargeable battery 10. The resistor R1 and the Thermistor R_TS form a voltage divider circuit. In the instant embodiment, the resistance of the resister R1 is fixed e.g., 10 kiloohm (KΩ). The voltage divider circuit formed of the resistor R1 and the Thermistor R_TS may generate corresponding voltage at the second end of the resistor R1 according to the resistance variation of the Thermistor R_TS.

A first end of the resistor R2 is coupled to the second end of the resistor R1 and the temperature output pin of the rechargeable battery 10. In the instant embodiment, the buffer BUF1 is realized as an operational amplifier, however the actual type of the buffer BUF1 is not limited by the present disclosure. A non-inverting terminal of the buffer BUF1 is coupled to a second end of the resistor R2. Such that the resistor R2 may be used to prevent current generated by the power terminal VCC from flowing into the non-inverting terminal of the buffer BUF1. The buffer BUF1 has an inverting terminal coupled to an output terminal thereof. So that the buffer BUF1 can receive the voltage generated at the junction of the first end of the resistor R2 and the temperature output pin of the rechargeable battery 10, and output a temperature signal TS accordingly. In the other words, the voltage level of the temperature signal TS corresponds to the voltage level at the junction of the first end of the resistor R2 and the temperature output pin of the rechargeable battery 10.

Figure 3:
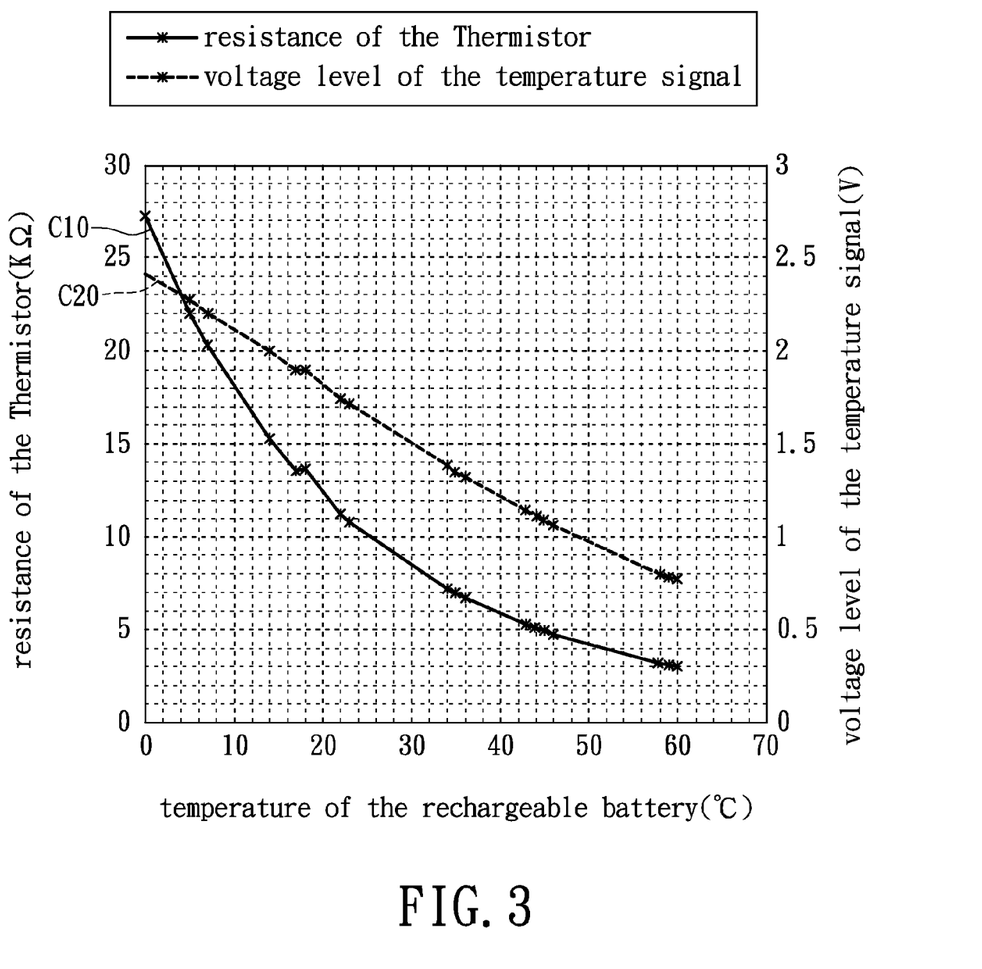
FIG. 3 is a diagram illustrating a relationship among temperature of a rechargeable battery, resistance of a Thermistor, and temperature signal in accordance to the first embodiment of the present disclosure.

Referring to FIG. 3, which shows a diagram illustrating relationship among temperature of the rechargeable battery 10, resistance of the Thermistor R_TS, and the temperature signal TS according to the first embodiment of the present disclosure. Curve C10 (shown as solid line) represents the relationship between the temperature of the rechargeable battery 10 and the resistance of the Thermistor R_TS. Curve C20 (shown as dotted line) represents the relationship between the temperature of the rechargeable battery 10 and the temperature signal TS. It is noteworthy that Curves C10 and C20 are generated based on the relative temperature value and the corresponding resistance in accordance to the Thermistor R_TS specification as well as the voltage divider circuit of the Thermistor R_TS and the resistor R1, wherein the resistance of the resistor R1 is set to be 10 kiloohm (KΩ). As mentioned, the predefined temperature range associated with the rechargeable battery 10 is defined from 0 degree Celsius to 60 degree Celsius. As described by the Curve C10, the resistance of the Thermistor R_TS gradually decreases as the temperature of the rechargeable battery 10 increases. At the same time the voltage level of the temperature signal TS gradually decreases as the temperature of the rechargeable battery 10 increases as shown by the Curve C20. Consequently, the variances in the temperature of the rechargeable battery 10 can be determined from the voltage level of the temperature signal TS.

Moreover, referring back to FIG. 2, upon receiving the temperature signal TS outputted from the buffer BUF1, the current control unit 220 can instantly output the control voltage Vc according to the voltage level of the temperature signal TS, so as to control the charging current outputted by the charging IC of the charging unit 230. In particular, the comparators COMP1~COMP6 can compare the voltage level of the temperature signal TS respectively to determine the temperature of the rechargeable battery 10. The comparators COMP1~COMP6 may be respectively implemented by operational amplifiers, however, the actual types and/or structures adopted for the comparators COMP1~COMP6 is not limited by the present disclosure A non-inverting terminal of the comparator COMP1 is coupled to a minimum reference voltage Vref_min. An inverting terminal of comparator COMP1 is coupled to the output terminal of the buffer BUF1. An output terminal of comparator COMP1 is coupled to an anode of the diode D1. A non-inverting terminal of the comparator COMP2 is coupled to the output terminal of the buffer BUF1. An inverting terminal of comparator COMP2 is coupled to a maximum reference voltage Vref_max while an output terminal thereof is coupled to an anode of the diode D2.

The resistor R3 has a first end thereof coupled to the power terminal VCC, and a second end thereof coupled to a current control pin ISET of the charging IC 231. A drain of the power transistor Q1 is coupled to the second end of resistor R3. A source of the power transistor Q1 is coupled to the ground GND. A gate of the power transistor Q1 is coupled to the source thereof. The gate of the power transistor Q1 is further coupled to a cathode of the diode D1 and a cathode of the diode D2. Accordingly, the comparators COMP1 and COMP2 can through controlling the operations of the power transistor Q1 drive the charging IC 231.

More specifically, the minimum reference voltage Vref_min and the maximum reference voltage Vref_max are respectively configured according to the Curve C20 shown in FIG. 3 for defining the predefined temperature range. In the instant embodiment, the minimum reference voltage Vref_min can be set as 0.77 volt according to a voltage level in corresponding to the maximum value of the predefined temperature range (e.g., 60 degree Celsius) while the maximum reference voltage Vref_max can be set to 0.24 volt according to a voltage level which corresponds to the minimum value of the predefined temperature range (e.g., 0 degree Celsius). The minimum reference voltage Vref_min is less than the maximum reference voltage Vref_max.

When the voltage level of the temperature signal TS is lower than the minimum reference voltage Vref_min, i.e., when the temperature of the rechargeable battery 10 is higher than 60 degree Celsius, the comparator COMP1 outputs a high voltage level signal to the gate of the power transistor Q1 through the diode D1 turning on the power transistor Q1 so as to have the charging IC 231 discontinue outputting the charging current. In particular, when the power transistor Q1 is turned on, the control voltage Vc of zero voltage level is outputted at the second end of the resistor R3 to the current control pin ISET of the charging IC 231, so as to have the charging IC 231 discontinue outputting the charging current to the rechargeable battery 10. At the same time, since the voltage level of the temperature signal TS is less than the minimum reference voltage Vref_min i.e., less than the maximum reference voltage Vref_max, the comparator COMP2 therefore outputs a low voltage level signal forcing the diode D2 operated in reverse-biased mode thereby forming an open circuit hence the operation the power transistor Q1 is not affected.

Similarly, when the voltage level of the temperature signal TS is greater than the maximum reference voltage Vref_max, i.e., when the temperature of the rechargeable battery 10 is lower than 0 degree Celsius, the comparator COMP2 outputs a high voltage level signal to the gate of the power transistor Q1 through the diode D2 turning on the power transistor Q1 to have the charging IC 231 discontinue outputting the charging current. At the same time, since the voltage level of the temperature signal TS is greater than the minimum reference voltage Vref_min so that the comparator COMP1 outputs a low voltage level signal forcing the diode D1 operated in reverse-biased mode thereby forming an open circuit so that the operation of the power transistor Q1 is not affected.

Alternatively, the comparators COMP1, COMP2 are for defining the maximum value (e.g., 60 degree Celsius) and the minimum value (e.g., 0 degree Celsius) of the predefined temperature range. When the voltage level of temperature signal TS exceeds the range of the voltage level in corresponding to the predefined temperature range, the comparators COMP1 and COMP2 operate to have the charging IC 231 discontinued outputting the charging current, stop charging the rechargeable battery 10. Hence, the rechargeable battery 10 can be protected from being charged at extreme temperature of the rechargeable battery 10 thereby may enhance the lifetime of the rechargeable battery 10.

The comparators COMP3~COMP6 are used herein to define various charging current values needed for charging the battery 10 at different temperature point within the predefined temperature range. For example, when the temperature of the rechargeable battery 10 becomes too high or too low, the charging current with smaller C value can be used to charge the rechargeable battery 10 to protect the rechargeable battery 10; when the temperature of the rechargeable battery 10 is within the normal temperature range, the charging current with larger C value can be used to charge the rechargeable battery 10 to shorten the overall charging period of the rechargeable battery 10.

To put it concretely, a non-inverting terminal of the comparator COMP3 is coupled to the output terminal of the buffer BUF1 while an inverting terminal of the comparator COMP3 is coupled to a first reference voltage Vref_1. An output terminal of the comparator COMP3 is coupled to a first end of the resistor R4. The diode D3 has anode thereof coupled to a second end of the resistor R4 and a cathode thereof coupled to both a gate of the power transistor Q3 and a gate of the power transistor Q5. A non-inverting terminal of the comparator COMP4 is coupled to the output terminal of the buffer BUF1 while an inverting terminal of the comparator COMP4 is coupled to a second reference voltage Verf_2. An output terminal of the comparator COMP4 is coupled to a first end of the resister R6. A non-inverting terminal of the comparator COMP5 is coupled to the output terminal of the buffer BUF1 while an inverting terminal of the comparator COMP5 is coupled to a third reference voltage Verf_3. An output terminal of the comparator COMP5 is coupled to a first end of the resistor R8. The diode D4 has an anode thereof coupled to a second end of the resistor R8 and a cathode thereof is coupled to both the gate of the power transistor Q3 and the gate of the power transistor Q5. A non-inverting terminal of the comparator COMP6 is coupled to the output terminal of the buffer BUF1 while an inverting terminal of the comparator COMP6 is coupled to a fourth reference voltage Verf_4. The first reference voltage Verf_1 is greater than or equal to the minimum reference voltage Verf_min while smaller than the second reference voltage Verf_2. The second reference voltage Verf_2 is less than the third reference voltage Verf_3. The third reference voltage Verf_3 is less than the fourth reference voltage Verf_4. The fourth reference voltage Verf_4 is less than the maximum reference voltage Verf_max.

A drain of the power transistor Q2 is coupled to the output terminal of the comparator COMP3 wherein the drain of the power transistor Q2 is also coupled to the first end of the resistor R4. A source of the power transistor Q2 is coupled to the ground GND. A gate of the power transistor Q2 is coupled to the output terminal of the comparator COMP4. The gate of the power transistor Q2 is further coupled to the source of the power transistor Q2.

A drain of the power transistor Q3 is coupled to a second end of the resistor R6 and a gate of the power transistor Q4. A source of the power transistor Q3 is coupled to the ground GND. The gate of the power transistor Q3 is coupled to the cathode of the diode D3 and the cathode of the diode D4. The gate of the power transistor Q3 is also coupled to the source thereof. A first end of the resistor R5 is coupled to the second end of the resistor R3. Or equivalently, the first end of the resistor R5 is coupled to the current control pin ISET of the charging IC 231. A second end of the resistor R5 is coupled to a drain of the power transistor Q4. A source of the power transistor Q4 is coupled to the ground GND. The gate of the power transistor Q4 is coupled to the second end of the resistor R6 and the drain of the power transistor Q3. The gate of the power transistor Q4 is also coupled to the source thereof.

A first end of the resistor R7 is coupled to the second end of the resistor R3. Or equivalently, the first end of the resistor R7 is coupled to the current control pin ISET of the charging IC 231. A second end of the resistor R7 is coupled to a drain of the power transistor Q5. A source of the power transistor Q5 is coupled to the ground GND. The gate of the power transistor Q5 is coupled to the cathode of the diode D3 and the cathode of the diode D4. The gate of the power transistor Q5 is also coupled to the source thereof.

A first end of the resistor R9 is coupled to the second end of the resistor R3. Or equivalently, the first end of the resistor R9 is coupled to the current control pin ISET of the charging IC 231. A second end of the resistor R9 is coupled to a drain of the power transistor Q6. A source of the power transistor Q6 is coupled to the ground GND. A gate of the power transistor Q6 is coupled to an output terminal of the comparator COMP6. The gate of the power transistor Q6 is also coupled to the source thereof.

More specifically, when the voltage level of the temperature signal TS is greater than the first reference voltage Vref_1 while less than the second reference level Vref_2, the comparator COMP3 outputs a high voltage level signal respectively through the resistor R4 and the diode D3 to the gate of the power transistor Q3 and the gate of the power transistor Q5 so as to simultaneously conduct the power transistors Q3 and Q5. Meanwhile, as the voltage level of the temperature signal TS is less than the third reference voltage Vref_3, the comparator COMP5 thus outputs a low voltage level signal forcing the diode D4 operated in reverse-biased mode thereby forming an open circuit so that the operations of the power transistors Q3 and Q5 are not affected. Moreover, the power transistors Q3, Q5 turned on connecting the resistor R3 and the resistor R7 in series thereby forming a voltage divider circuit outputting the control voltage Vc to the current control pin ISET of the charging IC 231 from the second end of the resistor R3 to have the charging IC 231 outputting a first predefined charging current.

When the voltage level of the temperature signal TS is greater than the second reference voltage Vref_2 while less than the third reference level Vref_3, the comparator COMP4 outputs a high voltage level signal to conduct the power transistor Q2 pulling down the gate voltages of the power transistor Q3 and the power transistor Q5 thereby turning off the power transistors Q3 and Q5. At the same time, the comparator COMP4 turns on the power transistor Q4 connecting the resistor R3 and the resistor R5 in series forming a voltage divider circuit outputting the control voltage Vc to the current control pin ISET of the charging IC 231 from the second end of the resistor R3 to have the charging IC 231 outputting a second predefined charging current.

When the voltage level of the temperature signal TS is greater than the third reference voltage Vref_3 while less than that the fourth reference level Vref_4, the comparator COMP5 outputs a high voltage level signal respectively through the resistor R8 and the diode D4 to the gate of the power transistor Q3 and the gate of the power transistor Q5, turning on the power transistors Q3 and Q5. At the same time, the power transistors Q2 and Q4 are still turned on by the comparator COMP4 pulling down voltage at the output terminal of the comparator COMP3 forcing the diode D3 operated in reverse-biased mode forming an open circuit so that the operations of the power transistors Q3 and Q5 are not affected by the comparator COMP3. Moreover, as the power transistors Q3 and Q5 being turned on, the power transistor Q3 pulls down the gate voltage of the power transistor Q4 turning off the power transistor Q4 which in turns enabling the resistor R3 and the resistor R7 connected in series forming a voltage divider circuit outputting the control voltage Vc to the current control pin ISET of the charging IC 231 from the second end of the resistor R3 for driving the charging IC 231 outputting the first predefined charging current.

When the voltage level of the temperature signal TS is greater than the fourth reference voltage Vref_4 while being less than the maximum reference level Vref_max, the comparator COMP6 outputs a high voltage level signal turning on the power transistor Q6 connecting the resistor R9 and the resistor R7 in parallel. The parallel circuit formed of the resistor R9 and the resistor R7 is further series-connected to the resistor R3 forming a voltage divider circuit outputting the control voltage Vc to the current control pin ISET of the charging IC 231 from the second end of the resistor R3 to drive the charging IC 231 outputting a third predefined charging current.

It is worth to note that the third predefined charging current is smaller than the first predefined charging current and the first predefined charging current is smaller than the second predefined charging current. The voltage level of the control voltage Vc may be defined in accordance to the overall resistance of the resistor R3 via configuring the resistances of the resistors R5, R7, and R9. The charging IC 231 can output the charging current with the first predefined charging current, the second predefined charging current or the third predefined charging current in corresponding to the voltage level of control voltage Vc for satisfying the overall charging requirements required of the rechargeable battery 10 at various temperature point thereby increase the associated charging efficiency.

In practice, the resistances of the resistors R4, R6, and R8 can be configure in accordance with the actual operation of the circuit, for instance can be set as 10 kiloohm (KΩ). The high level signal or the low level signal outputted from the comparators COMP1~COMP6 are configured respectively according to the supplied voltages at the positive and the negative power terminals of the comparators COMP1~COMP6. The high voltage level signals outputted from the comparators COMP1~COMP6 shall be greater than conducting voltages of the power transistors Q1~Q6 in order to control the on/off operations of the power transistors Q1~Q6. It shall be noted those skilled in the art should be able to deduce the actual configuration and implementation of the high level or low level signals outputted by the comparators COMP1~COMP6 and further descriptions are therefore omitted.

The first reference voltage Vref_1, the second reference voltage Vref_2, the third reference voltage Vref_3, and the fourth reference voltage Vref_4 may be configured respectively according to the Curve C20 shown in FIG. 3 to define different temperature ranges. So that the charging IC 231 can be controlled to output the corresponding charging current according to the different temperature ranges thereby increase the associated charging efficiency. In the instant embodiment, 45 degree Celsius to 60 degree Celsius may be defined as a first high temperature range in corresponding to the first predefined charging current e.g., 0.5 C. Similarly, 23 degree Celsius to 45 may be defined as a normal temperature range in corresponding to the second predefined charging current e.g., 0.7 C. Further, 14 degree Celsius to 23 degree Celsius may be defined as a first low temperature range in corresponding to first predefined charging current e.g., 0.5 C. Lastly, 0 degree Celsius to 14 degree Celsius can be defined as a second low temperature range and correspond to the third predefined charging current e.g., 0.15 C.

For instance, the first reference voltage Vref_1 may be configured as 0.77 V in correspondence to the maximum value of the first high temperature range (e.g., 60 degree Celsius). The second reference voltage Vref_2 may be configured as 1.09V in correspondence to the maximum value of the normal temperature range (e.g., 45 degree Celsius). The third reference voltage Vref_3 may be configured as 1.71V in correspondence to the maximum value of the second low temperature range (e.g., 23 degree Celsius). The fourth reference voltage Vref_4 may be configured as 2V in correspondence to the maximum value of the first low temperature range (e.g., 14 degree Celsius).

As aforementioned, the voltage level of the control voltage Vc can be defined by configuring the resistances associated with the resistors R5, R7, and R9. One implementation for the control voltage Vc may be setting the voltage level of the control voltage in corresponding to the third predefined charging current to 0.132 V; setting the voltage level of the control voltage Vc in corresponding to the first predefined charging current to 0.44 V; set the voltage level of the control voltage Vc in corresponding to the second predefined charging current to 0.616 V. However, the actual configurations of the control voltage may depend upon the actual operations of the battery charging circuit 20 and the instant embodiment is not limited thereto.

Figure 4:
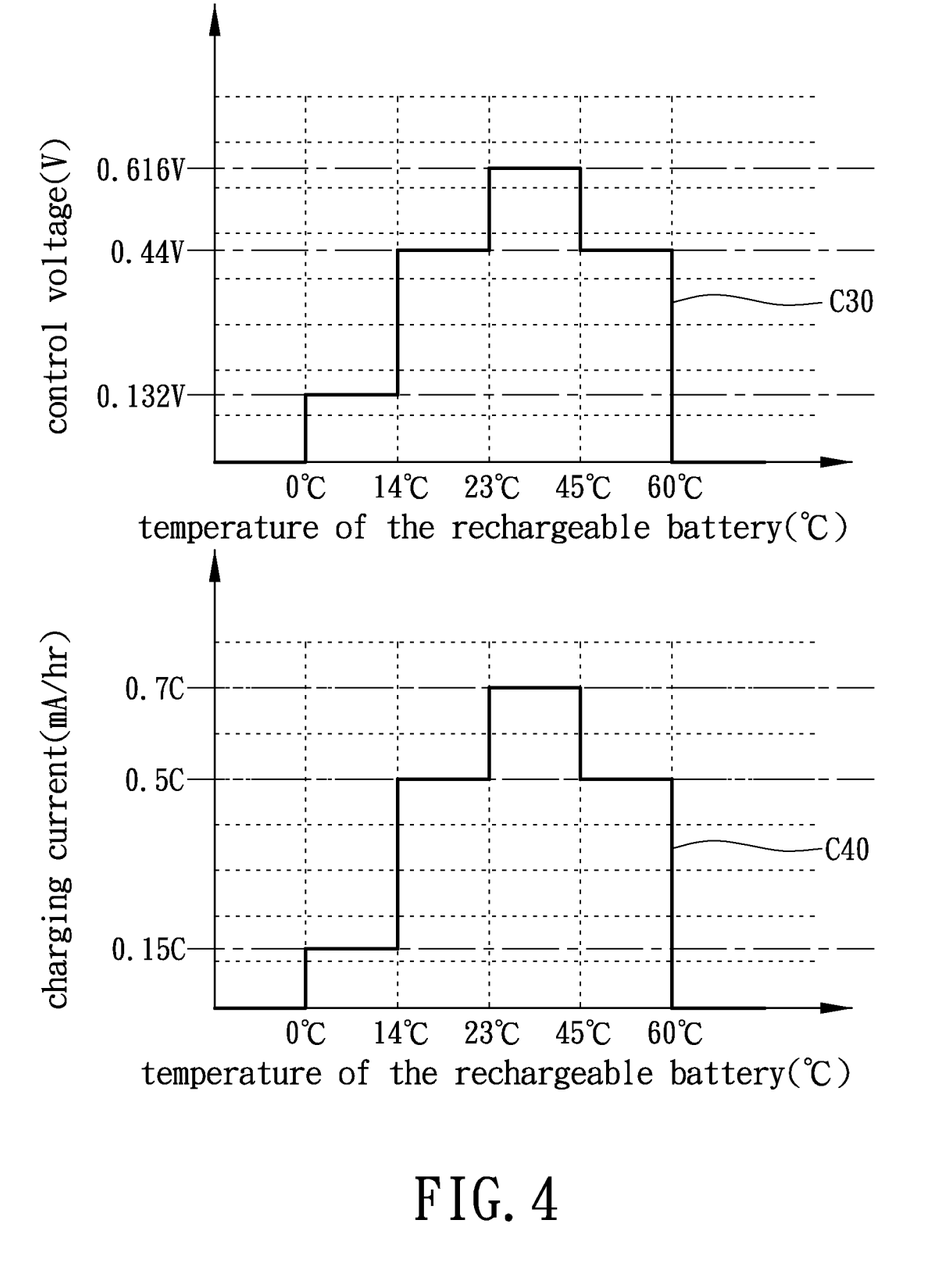
FIG. 4 is an exemplary waveform illustrating the battery charging circuit operation in accordance to the first embodiment of the present disclosure.

Referring to FIG. 4 in conjunction to FIG. 2, FIG. 4 is an exemplary waveform illustrating the battery charging circuit operation provided in accordance to the first embodiment of the present disclosure. The Curve C30 represents the relationship between the voltage level of the control voltage Vc of the battery charging circuit 20 and the temperature of the rechargeable battery 10. The Curve C40 represents the relationship between the charging current for the battery charging circuit 20 and the temperature of the rechargeable battery 10.

As shown by curve C30 and curve C40, when the temperature of the rechargeable battery 10 becomes higher than 60 degree Celsius or lower than 0 degree Celsius, the current control unit 220 outputs the control voltage Vc of 0V to the current control pin ISET of the charging IC 231 to have the charging IC 231 discontinue outputting the charging current to the rechargeable battery 10.

When the temperature of the rechargeable battery 10 falls between 0 degree Celsius and 14 degree Celsius, that is, when the temperature of the rechargeable battery 10 lies within the first low temperature range, the current control unit 220 outputs the control voltage Vc of 0.132V to the current control pin ISET of the charging IC 231 to drive the charging IC 231 outputting the charging current of 0.15 C ampere (A) (i.e., the third predefined charging current) to charge the rechargeable battery 10.

When the temperature of the rechargeable battery 10 falls between 14 degree Celsius and 23 degree Celsius, that is, when the temperature of the rechargeable battery 10 lies within the second low temperature range, the current control unit 220 outputs the control voltage Vc of 0.44 V to the current control pin ISET of the charging IC 231 s to drive the charging IC 231 outputting the charging current of 0.5 C A (i.e., the first predefined charging current) to charge the rechargeable battery 10.

When the temperature of the rechargeable battery 10 falls between 23 degree Celsius and 45 degree Celsius, that is, when the temperature of the rechargeable battery 10 lies in within the normal temperature range, the current control unit 220 outputs the control voltage Vc of 0.616V to the current control pin ISET of the charging IC 231 to drive the charging IC 231 outputting the charging current of 0.7 C A (i.e., the second predefined charging current) to charge the rechargeable battery 10.

When the temperature of the rechargeable battery 10 falls between 45 degree Celsius and 60 degree Celsius, that is, when the temperature the rechargeable battery 10 lies within the first high temperature range, the current control unit 220 outputs the control voltage Vc of 0.44V to the current control pin ISET of the charging IC 231 to drive the charging IC 231 outputting the charging current of 0.5 C A (i.e., the first predefined charging current) to charge the rechargeable battery 10.

In other words, when the temperature of the rechargeable battery 10 becomes higher than 0 degree Celsius, the current control unit 220 gradually increases the voltage level of the control voltage Vc according to the temperature of the rechargeable battery 10 so as to control the charging IC 231 to gradually increase the charging current. When the temperature of the rechargeable battery 10 becomes higher than the threshold value e.g., 45 degree Celsius, the current control unit 220 decreases the voltage level of the control voltage so as to control the charging IC 231 to gradually decrease the charging current. The aforementioned operations of the battery charging circuit 20 within the predefined temperature range can summarized in the table below.

| Temperature of the rechargeable battery (□) | Charging current (mA/hr) | control voltage (V) |
| --- | --- | --- |
| 0~14 | 0.15 C | 0.132 |
| 14~23 | 0.5 C | 0.44 |
| 23~45 | 0.7 C | 0.616 |
| 45~60 | 0.5 C | 0.44 |

The disclosed battery charging circuit 20 can correspondingly configure the charging current according to the variance in temperature of the rechargeable battery 10 thereby can effectively protect the rechargeable battery 10 while shorten the associated charging period.

It is noteworthy that, in practice, the above-described maximum reference voltage Vref_man, the minimum reference voltage Vref_min, the first reference voltage Vref_1, the second reference voltage Vref_2, the third reference voltage Vref_3 and the fourth reference voltage Vref_4 may be implemented by using a resistor-based voltage divider circuit or a voltage regulator such as a Zener diode. The aforementioned relationship between the control voltage Vc, the corresponding charging current and the aforementioned charging current can be implemented through designing the charging IC 231, however, the instant embodiment is not limited thereto. Similarly, the exact temperature ranges may be configured according to the specific type and the structure of the rechargeable battery 10. The quantization of the charging current may depend on actual charging requirements. Additionally, the exact value of the maximum reference voltage Vref_man, the minimum reference voltage Vref_min, the first reference voltage Vref_1, the second reference voltage Vref_2, the third reference voltage Vref_3, or the fourth reference voltage Vref_4 may be respectively configured according to the specification of the Thermistor R_TS and the actual implementation of the battery charging circuit 20. FIG. 3 only serve to illustrate the operation of the battery charging circuit 20 for a specific type of the Thermistor and the scope of the present disclosure is not limited thereto. Similarly, FIG. 4 only serves to describe an exemplary circuit operation associated with the battery charging circuit and the present disclosure is not limited thereto.

It shall be noted that the exact type, actual circuitry structure, implementation method and/or connection method associated the rechargeable battery 10, the temperature sensing unit 210, the current control unit 220, and the charging unit 230.

[Second Embodiment]

Figure 5:
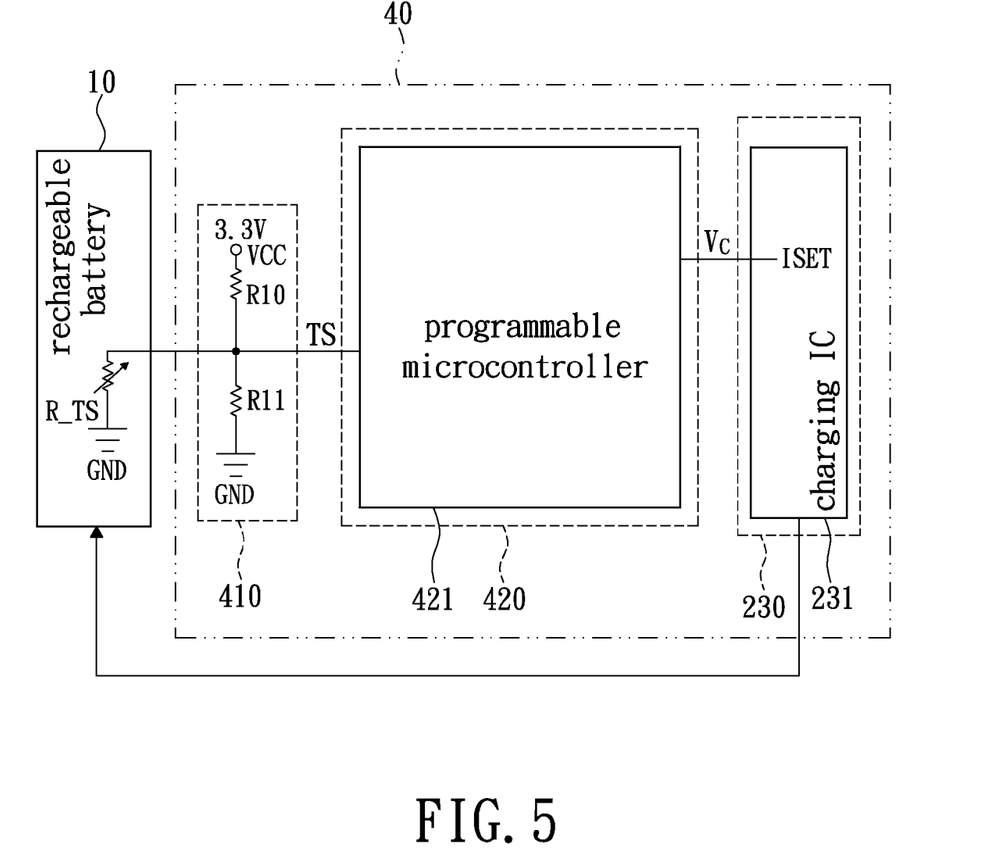
FIG. 5 shows a schematic diagram illustrating a battery charging circuit in accordance to a second embodiment of the present disclosure.

The temperature sensing unit 210 and the current control unit 220 in the first embodiment may have different implementation. Referring to FIG. 5, which shows a battery charging circuit in accordance to a second embodiment of the present disclosure. In the instant embodiment, the battery charging circuit 40 is coupled to the rechargeable battery and outputs the charging current to charge the rechargeable battery 10 according to the temperature of the rechargeable battery 10. When temperature of the rechargeable battery 10 exceeds the predefined temperature range, (e.g., 0 degree Celsius to 60 degree Celsius), the battery charging circuit 40 terminate the charging process of the rechargeable battery 10, so as to protect the rechargeable battery 10 thereby increase the associated lifetime thereof.

The difference between FIG. 5 and FIG. 2 is in the circuit structure of the battery charging circuit 40. In the instant embodiment, the temperature sensing unit 410 of the battery charging circuit 40 includes the resistors R10 and R11. The current control unit 420 of the battery charging circuit 40 includes a programmable microcontroller 421.

The rechargeable battery 10 has a Thermistor R_TS with negative temperature coefficient arranged therein. The Thermistor R_TS is coupled between a temperature output pin of the rechargeable battery 10 and a ground GND. A first end of the resistor R10 is coupled to a power terminal VCC, and a second end of the resistor R10 is coupled to the temperature output pin of the rechargeable battery 10. The resistor R11 has a first end thereof coupled to the temperature output pin of the rechargeable battery 10 and a second end thereof coupled to the ground GND. The resistor R11 and the Thermistor R_TS are connected in parallel which is further series-connected to the resistor R10. Consequently, the temperature sensing unit 410 can generate and output the temperature signal TS at the second end of the resistor R10 to the programmable microcontroller 421 according to the variance in the resistance of the Thermistor R_TS. The resistor R11 can be used to limit the current flowing into the programmable microcontroller 421 through the pin thereof.

Specifically, the second end of the resistor R10 can be coupled to the programmable microcontroller 421, e.g., through a general purpose input (GPI) to input the temperature signal TS to the programmable microcontroller 421. The programmable microcontroller 421 can be coupled to the current control pin ISET of the charging IC 231, through a general purpose output (GPO), for outputting the corresponding control voltage Vc to the charging IC 231 configuring the charging current outputted from the charging IC 231. In summary, the programmable microcontroller 421 can establish the above-described comparing mechanism of the temperature signal TS via software design implementation, such that the control voltage Vc can be outputted according to the variance in the temperature of the rechargeable battery 10 and to drive the charging IC 231 outputting the corresponding charging current. Henceforth, the programmable microcontroller 421 can be used to implement the current control unit 220 of FIG. 1 forming from the integrated circuit consisting of comparators, resistors, diodes and power transistors thereby reducing the area needed for the battery charging circuit.

It is noteworthy that, the rest of circuit structure of the battery charging circuit 40 is essentially the same as the battery charging circuit 20 shown in FIG. 2 and based on the above elaborations, those skilled in the art should be able to infer the operation associated with the battery charging circuit 40, hence further descriptions are therefore omitted. FIG. 5 is only an illustration diagram provided in accordance to the instant embodiment of the present disclosure, and the present disclosure is not limited thereto. Similarly, the cope of the present disclosure does not limit the type, the exact type, structure, implementation method, and/or connection method associated with the rechargeable battery 40, the temperature sensing unit 410, the current control unit 420, and the charging unit 230.

In summary, the present disclosure illustrates the battery charging circuit which can actively generate the charging current according to the sensed temperature of the rechargeable battery and effectively charge the rechargeable battery. Consequently, the battery charging period may be shortened increasing the associated charging efficiency. When the temperature of the rechargeable battery exceeds the predefined temperature range, the battery charging circuit stop charging the rechargeable battery instantly, hence may effectively protect the rechargeable battery increasing the associated charging efficiency thereby enhancing the lifetime of the rechargeable battery.

Additionally, the actual circuit structure of the battery charging circuit can be configured according to the type of the rechargeable battery to define an associated predefined temperature range and the corresponding charging current. In particular, the battery charging circuit may be implemented by an integrated circuit formed of comparators, resistors and power transistors, or by a programmable microcontroller thus increase the practicality of the battery charging circuit The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A battery charging circuit, adapted for charging a rechargeable battery, comprising:
    a temperature sensing unit, coupled to a temperature output pin of the rechargeable battery, outputting a temperature signal according to the temperature of the rechargeable battery, wherein the temperature sensing unit comprises:
    a first resistor, coupled between a power terminal and the temperature output pin; and
    a buffer, having a non-inverting terminal coupled to the temperature output pin through a second resistor and an inverting terminal coupled to an output terminal of which the temperature signal is outputted to the current control unit;
    a current control unit, coupled to the temperature sensing unit, outputting a control voltage according to the temperature signal; and
    a charging unit, coupled to the current control unit, the charging unit outputting a charging current charging the rechargeable battery according to the control voltage;
    wherein the charging unit discontinues outputting the charging current when the temperature of the rechargeable battery exceeds a predefined temperature range; the charging unit gradually increases the charging current according to the temperature of the rechargeable battery when the temperature of the rechargeable battery is higher than a minimum value of the predefined temperature range; the charging unit discontinues outputting the charging current when the temperature of the rechargeable battery is higher than a maximum value of the predefined temperature range.

2. The battery charging circuit according to claim 1, wherein a minimum value of the predefined temperature range is 0 degree Celsius and a maximum value of the predefined temperature range is 60 degree Celsius.

3. The battery charging circuit according to claim 1, wherein the charging unit gradually decreases the charging current according to the temperature of the rechargeable battery when the temperature of the rechargeable battery is higher than a threshold value; wherein the threshold value is higher than the minimum value of the predefined temperature range while lower than the maximum value of the predefined temperature range.

4. The battery charging circuit according to claim 1, wherein the current control unit comprises:
    a first comparator, having a non-inverting terminal coupled to a minimum reference voltage and an inverting terminal of the first comparator coupled to the output terminal of the buffer;
    a first diode, an anode thereof coupled to an output terminal of the first comparator;
    a second comparator, having a non-inverting terminal coupled to the output terminal of the buffer and an inverting terminal of the second comparator coupled to a maximum reference voltage;
    a second diode, an anode thereof coupled to an output terminal of the second comparator;
    a third resistor, a first end thereof coupled to the power terminal and a second end thereof coupled to the charging unit; and
    a first power transistor, having a drain coupled to the second end of the third resistor, a source coupled to a ground, and a gate respectively coupled to a cathode of the first diode and a cathode of the second diode;

wherein the minimum reference voltage corresponds to a maximum value of the predefined temperature range and the maximum reference voltage corresponds to a minimum value of the predefined temperature range, wherein the minimum reference voltage is less than the maximum reference voltage; wherein the first power transistor conducts to have the charging unit discontinue outputting the charging current when the voltage level of the temperature signal is less than the minimum reference voltage or when the voltage level of the temperature signal is greater than the maximum reference voltage.

5. The battery charging circuit according to claim 4, wherein the current control unit further comprises:
   a third comparator, having a non-inverting terminal coupled to the output terminal of the buffer and an inverting terminal coupled to a first reference voltage;
   a fourth resistor, a first end thereof coupled to an output terminal of the third comparator;
   a third diode, an anode thereof coupled to a second end of the fourth resistor;
   a fourth comparator, having a non-inverting terminal coupled to the output terminal of the buffer and an inverting terminal coupled to a second reference voltage;
   a sixth resistor, a first end thereof coupled to an output terminal of the fourth comparator;
   a fifth comparator, having a non-inverting terminal coupled to the output terminal of the buffer and an inverting terminal coupled to a third reference voltage;
   an eighth resistor, a first end thereof coupled to an output terminal of the fifth comparator;
   a fourth diode, an anode thereof coupled to a second end of the eighth resistor;
   a sixth comparator, having a non-inverting terminal coupled to the output terminal of the buffer and an inverting terminal coupled to a fourth reference voltage;
   a second power transistor, having a drain coupled to the output terminal of the third comparator, a source coupled to the ground, and a gate coupled to the output terminal of the fourth comparator;
   a third power transistor, having a drain coupled to a second end of the sixth resistor, a source coupled to the ground, and a gate respectively coupled to a cathode of the third diode and a cathode of the fourth diode;
   a fifth resistor, a first end thereof coupled to the second end of the third resistor;
   a fourth power transistor, having a drain coupled to a second terminal of the fifth resistor, a source coupled to the ground, and a gate respectively coupled to the second end of the sixth resistor and the drain of the third power transistor;
   a seventh resistor, a first end thereof coupled to the second end of the third resistor;
   a fifth power transistor, having a drain coupled to a second end of the seventh resistor, a source coupled to the ground, and a gate respectively coupled to the cathode of the third diode and the cathode of the fourth diode;
   a ninth resistor, a first end thereof coupled to the second end of the third resistor; and
   a sixth power transistor, having a drain coupled to a second end of the ninth resistor, a source coupled to the ground, and a gate coupled to an output terminal of the sixth comparator,
   wherein the first reference voltage is equal to the minimum reference voltage while less than the second reference voltage, the second reference voltage is less than the third reference voltage, the third reference voltage is less than the fourth reference voltage, and the fourth reference voltage is less than the maximum reference voltage.

6. The battery charging circuit according to claim 5, wherein when the voltage level of the temperature signal is greater than the first reference voltage, the third power transistor and the fifth power transistor conduct to have the seventh resistor and the third resistor connected in series for outputting the control voltage at the second end of the third resistor to the charging unit according to the voltage level of the power terminal so as to generate a first predefined charging current charging the rechargeable battery;
   when the voltage level of the temperature signal is greater than the second reference voltage, the second power transistor and the fourth power transistor conduct turning off the third power transistor and the fifth power transistor to have the fifth resistor and the third resistor connected in series for outputting the control voltage is at the second end of the third resistor to the charging unit according to the voltage level of the power terminal so as to generate a second predefined charging current charging the rechargeable battery;
   when the voltage level of the temperature signal is greater than the third reference voltage, the third power transistor and the fifth power transistor conduct turning off the fourth power transistor to have the seventh resistor and the third resistor connected in a series for outputting the control voltage at the second end of the third resistor to the charging unit according to the voltage level of the power terminal so as to generate the first predefined charging current charging the rechargeable battery;
   when the voltage level of the temperature signal is greater than the fourth reference voltage, the sixth power transistor conduct to have the seventh resistor and the ninth resistor connected in parallel, the parallel connected seventh resistor and ninth resistor being series connected to the third resistor for outputting the control voltage at the second end of the third resistor to the charging unit according to the voltage level of the power terminal so as to generate a third predefined charging current charging the rechargeable battery;
   wherein the third predefined charging current is smaller than the first predefined charging current and the first predefined charging current is smaller than the second predefined charging current.

7. The battery charging circuit according to claim 1, wherein the temperature sensing unit comprises:
   a tenth resistor, coupled between a power terminal and the temperature output pin; and
   an eleventh resistor, coupled between the temperature output pin and a ground;
   wherein the temperature signal is generated between the tenth resistor and the eleventh resistor.

8. The battery charging circuit according to claim 7, wherein the current control unit comprises:
   a programmable microcontroller, coupled between the junction of the tenth resistor and the eleventh resistor and the charging unit, outputting the control voltage to the charging unit according to the temperature signal.

9. The battery charging circuit according to claim 1, wherein the charging unit comprises:
   a charging IC, receiving the control voltage through a current control pin and outputting the charging current according the control voltage to charge the rechargeable battery.

* * * * *